United States Patent [19]

Lefrancois et al.

[11] Patent Number: 5,270,605
[45] Date of Patent: Dec. 14, 1993

[54] THREE-PHASE ALTERNATOR FOR A MOTOR VEHICLE

[75] Inventors: Philippe Lefrancois, Creteil; Pascal Couvert, Maison Alfort, both of France

[73] Assignee: Valeo Equipements Electriques Moteur, Creteil, France

[21] Appl. No.: 886,979

[22] Filed: May 21, 1992

[30] Foreign Application Priority Data

May 21, 1991 [FR] France ................................. 91 06116

[51] Int. Cl.[5] ............................................. H02K 1/22
[52] U.S. Cl. ....................................... 310/263; 310/51
[58] Field of Search ................ 310/51, 263, 179, 181, 310/254, 257, 267

[56] References Cited

U.S. PATENT DOCUMENTS

| | | | |
|---|---|---|---|
| 3,004,181 | 10/1961 | Noddin | 310/263 |
| 3,184,625 | 5/1965 | Farison | 310/263 |
| 3,226,581 | 12/1965 | Brewster | 310/263 |
| 3,252,025 | 5/1966 | Brown | 310/263 |
| 3,714,484 | 1/1973 | Habert | 310/263 |
| 4,263,526 | 4/1981 | Taguchi | 310/263 |
| 4,972,114 | 11/1990 | Frister | 310/263 |
| 4,980,595 | 12/1990 | Arora | 310/263 |
| 5,021,696 | 6/1991 | Nelson | 310/263 |

FOREIGN PATENT DOCUMENTS 2256572  7/1975  France ................................. 310/263

*Primary Examiner*—R. Skudy
*Attorney, Agent, or Firm*—Morgan & Finnegan

[57] ABSTRACT

A three-phase alternator for a motor vehicle has a rotor consisting of two pole wheels, each comprising a radial plate and a plurality of projecting teeth. Each tooth has an outer surface and two lateral surfaces, the outer surface being joined to a rear face of the radial plate through an inclined surface. Each tooth is formed with at least one antinoise chamfer adjacent to the outer surface, lateral surface, and inclined surface of the tooth, and adjacent also to the rear face, the antinoise chamfer being inclined by a different angle from that of each of these surfaces to which it is adjacent.

10 Claims, 3 Drawing Sheets

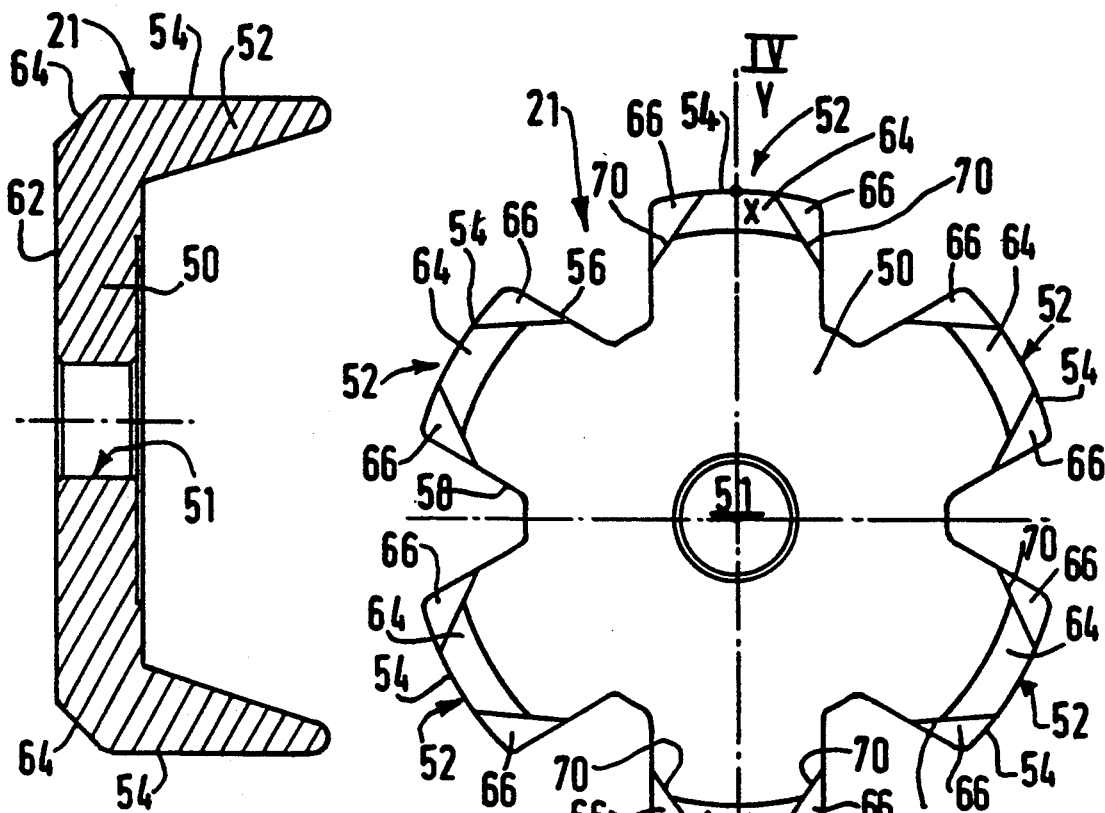
FIG. 4
FIG. 3
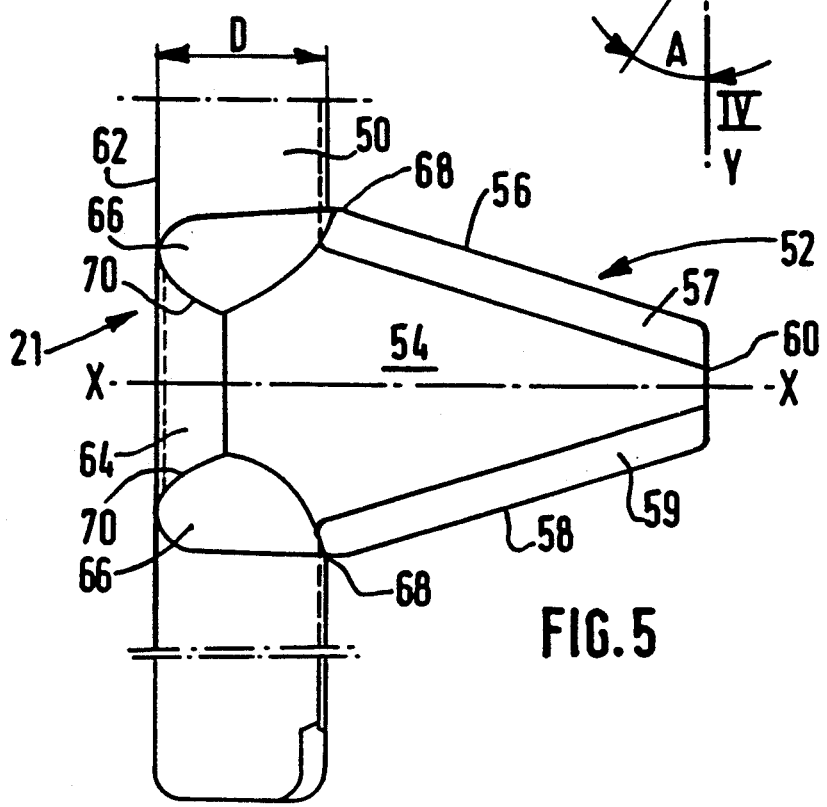
FIG. 5

THREE-PHASE ALTERNATOR FOR A MOTOR VEHICLE

FIELD OF THE INVENTION

The present invention relates generally to a three-phase alternator for a motor vehicle, and more particularly to a three-phase alternator having a rotor which is mounted rotatably in a stator and which comprises two polar wheels substantially identical to each other and arranged in opposed or facing relationship to each other.

BACKGROUND OF THE INVENTION

The two pole wheels are in the form of radial plates, each including teeth which project from the radial plate substantially parallel to the rotor axis in the manner of claws. The teeth of one of the pole wheels are offset circumferentially with respect to those of the other pole wheel, so that the teeth of the two wheels inter-penetrate with each other. The rotor winding being supplied with direct current, the teeth of one of the pole wheels constitute south poles while those of the other wheel constitute north poles. When the teeth move past the stator poles by virtue of rotation of the rotor, they set up an induced alternating current in the stator winding.

When an alternator of this kind is operating, it is necessary to cool it in such a way that the whole of the machine remains at a limited temperature so as to ensure its best performance. It is known to effect cooling of such alternators by means of a fan which is fixed to the rotor and arranged at one end of the latter, usually outside the casing which encloses the stator and the rotor.

In order to improve the cooling effect, and thus to increase the output of such alternators, it is becoming increasingly common to fit the fans inside the casing itself, with the fans then being secured on to the radial plates of the pole wheels so that their cooling vanes lie facing the stator windings which emit a substantial amount of heat. Although this design gives improved cooling and therefore increased electrical output from the alternator, it does have the drawback that it also gives rise to noise due to turbulence in the air within the casing.

An acoustic study has been carried out, and has demonstrated that these noises were the result, in particular, of movement of the turbulent air in the immediate proximity of the radial plate of the fan, that is to say close to the outer periphery of the pole wheels lying facing the stator windings. This noise becomes even greater since such alternators are now required to operate at ever-increasing speeds, e.g. 1800 to 2000 r.p.m..

In order to reduce this noise effect, consideration has been given to modifying the design of the fans themselves, for example by providing them with circumferentially asymmetrical vanes. Although it is found that such an arrangement enables the noise level to be attenuated in general terms, this attenuation is not by any means sufficient to result in the alternator being capable of being regarded as silent.

DISCUSSION OF THE INVENTION

The present invention overcomes these drawbacks, and to this end it provides a three-phase alternator for a motor vehicle, comprising firstly a stator assembly comprising a stack of sheet metal laminations and stator windings, and secondly a rotor assembly comprising two claw-type pole wheels arranged in opposed relationship, each pole wheel comprising a radial plate substantially at right angles to the axis of the rotor, with polar teeth being arranged on the periphery of the radial plate, the polar teeth being substantially parallel to the axis of the said rotor, the teeth of one of the said pole wheels being offset circumferentially with respect to the teeth of the other pole wheel, the polar teeth having a cylindrical outer surface which is joined, firstly through two peripheral chamfers to two respective lateral faces of the tooth, and secondly through an inclined surface to a rear face of the radial plate of the pole wheel, characterised in that each tooth has at least one antinoise chamfer which is adjacent to all of the said surfaces comprising: the outer surface; the lateral faces; the rear face; and the inclined surface, with each said antinoise chamfer being inclined to the radial direction by an inclination different from the corresponding inclinations of each of the said surfaces to which it is adjacent.

Preferably, each said tooth has two identical antinoise chamfers which are identical with respect to an axis of symmetry.

According to a preferred feature of the invention, each antinoise chamfer consists of a surface which is generally either flat or spherical.

According to another preferred feature of the invention, the antinoise chamfer defines a point of intersection with the lateral surface of the same tooth, the said point of intersection lying at a distance from the rear face of the radial plate of the tooth, the said distance being such that the said point of intersection lies approximately in a radial terminal plane defined by the laminated stator core.

Preferably, the antinoise chamfer defines an edge of intersection with the said inclined surface of the corresponding tooth, with the said edge of intersection making an angle in the range between 40° and 50° with a diametral axis passing through the centre of two diametrically opposed teeth, this angle being preferably 45°.

According to yet another preferred feature of the invention, the distance between the said point of intersection and the corresponding terminal plane of the stator core is no greater than 2 mm, this distance being preferably 0.5 mm.

A three-phase alternator for a motor vehicle in a preferred form according to the invention will be described below, by way of example only and with reference to the accompanying drawings.

BRIEF DESCRIPTION OF THE DRAWINGS

FIG. 3 is an end view on a pole wheel made in accordance with the invention, as seen in the direction of the arrow F in FIG. 1.

FIG. 4 is a cross section of the pole wheel taken on the line IV—IV in FIG. 3.

FIG. 5, which is on a larger scale, shows one tooth of the pole wheel.

DESCRIPTION OF A PREFERRED EMBODIMENT OF THE INVENTION

Figure 1:
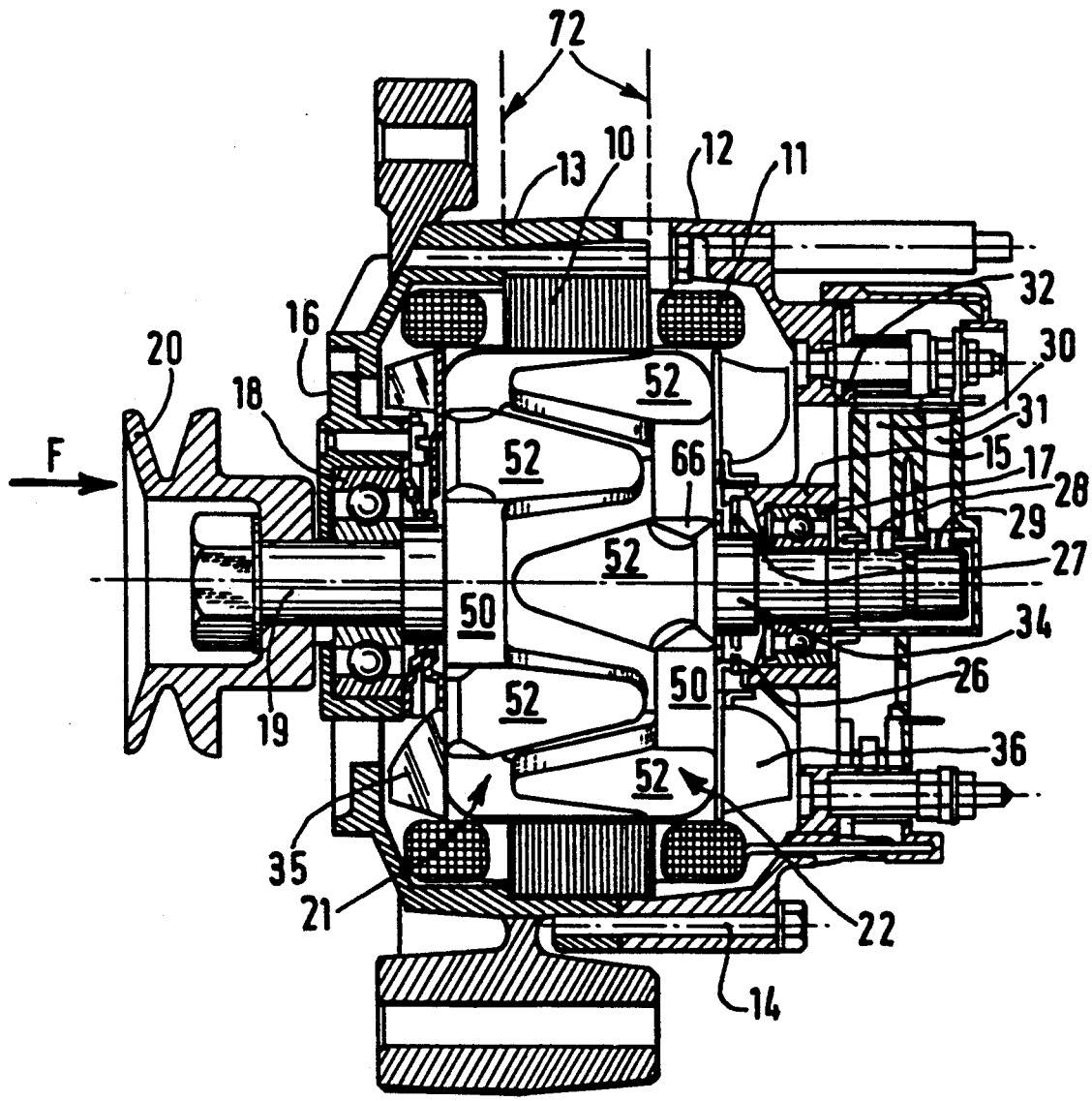
FIG. 1 is a general view in partial axial cross section, showing the alternator in accordance with the invention.

Reference is first made to FIG. 1, which is a general arrangement drawing of a motor vehicle alternator having a rotor in accordance with the present invention. This alternator comprises a stator assembly which includes a stator core 10 in the form of a stack of sheet metal laminations, having a set of slots which contain the stator windings 11. The stator assembly is retained in position between two end plates 12 and 13 which are fastened together by means of threaded studs 14.

Each of the end plates 12, 13 carries a bearing 15, 16 consisting of a ball bearing 17, 18 respectively. A shaft 19, which is driven by the engine of the vehicle through a pulley 20, rotates in these bearings 15 and 16. The shaft 19 carries the rotor assembly, which consists of two pole wheels 21 and 22 of the claw type, retaining between them a central rotor core (not shown) on which an inductive winding is carried. The rotor assembly is force-fitted on to the shaft 19 for rotation with the latter, for example by means of splines, not shown, formed on the shaft 19.

The ends of the inductive rotor winding are connected to hollow connectors indicated at 26 and 27 respectively, which are secured on a shoulder 34 formed on the shaft 19. The connectors 26 and 27 are connected through the shaft 19 to two slip rings 28 and 29 respectively, which are engaged by two brushes 30 and 31 respectively. These brushes are carried in a brush holder assembly 32.

Cooling fins indicated at 35 and 36 respectively are fixed to each pole wheel 21 and 22 on the side of the latter facing towards the corresponding bearing 15 or 16.

Figure 2:
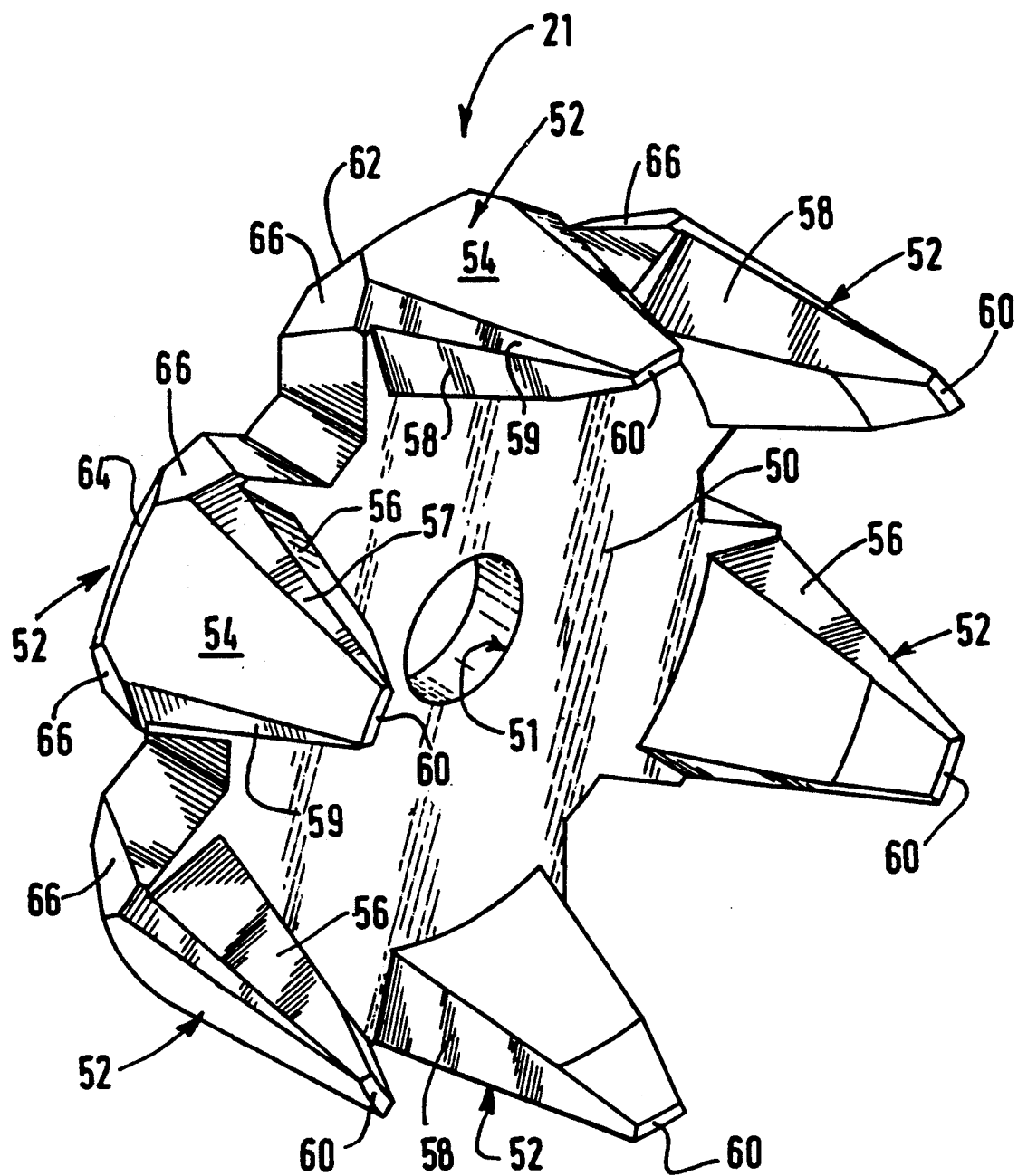
FIG. 2 is a perspective view on a larger scale, showing one of the pole wheels of the rotor of the alternator.

The two pole wheels 21 and 22 are identical to each other, so that in this description the same reference numerals will be used to denote the various elements of the pole wheels, with reference in particular to FIG. 2 which shows the pole wheel 21.

Each pole wheel 21, 22 comprises a flat radial plate 50 extending at right angles to the axis of the rotor shaft 19. The plate 50 includes a first surface (not identified) opposed to a rear surface 62. The central zone of the radial plate 50 is formed with a coaxial through bore 51 which receives the rotor shaft 19. Six polar teeth 52 are arranged integrally around the periphery of the radial plate 50. The teeth 52 are spaced apart at equal intervals and extend inwardly towards the other pole wheel, and are substantially parallel to the rotor axis.

The teeth 52 of the pole wheel 21 are offset by 30° circumferentially with respect to the teeth 52 of the pole wheel 22, so that the teeth of the respective pole wheels interpenetrate with each other and define, as can be seen in FIG. 1, an open, annular polar crown. The respective polarities of the two series of polar teeth 52 are opposed to each other, in such a way that the consecutive polar apertures present opposed polarities to the slots in the stator 10 of the alternator.

Referring now to FIGS. 2 to 5, and in particular to FIGS. 2 and 5, each polar tooth has a trapezoidal shape when viewed in developed form from the direction of the stator. The wide base of each tooth is joined to the radial plate 50 of the pole wheel. More precisely, each tooth 52 is delimited by a cylindrical outer surface 54 and by two lateral surfaces 56 and 58, which are joined to the outer surface 54, in a known manner, through respective peripheral chamfers indicated at 57 and 59.

At right angles to the radial plate 50, the lateral surfaces 56 and 58 are parallel to an axis of symmetry X—X of the tooth 52. Beyond the radial plate 50, the surfaces 56 and 58 are obliquely convergent and symmetrical with respect to the axis X—X, and are joined together through a terminal surface 60 perpendicular to the axis X—X and defining the free end of the tooth 52. The outer surface 54 is joined to the rear surface 62 of the radial plate 50 through an inclined surface 64.

Each tooth 52 has at least one chamfer 66, acting as an antinoise chamfer. This chamfer is at the same time adjacent to the outer surface 54 and the lateral surface 56 or 58 on the one hand, and to the surfaces 64 and 62 on the other hand. The antinoise chamfer 66 is inclined at a different angle from those by which these various surfaces to which it is adjacent are inclined. In this preferred example, each tooth 52 has two identical antinoise chamfers 66, which are arranged symmetrically about the axis X—X. The chamfers 66 may consist of generally flat or generally spherical surfaces, depending on how the pole wheels are made.

In this preferred example, the antinoise chamfer 66 extends from the rear surface 62 of the radial plate 50 over a depth D such that the point 68 of its intersection (see FIG. 5) with the lateral surface 56 or 58 lies approximately in line with the ends 72, i.e. the radial end planes, of the stator core 10, as can be seen in FIG. 1. Thus, if the distance between the point of intersection 68 and the end planes 72 of the stator core 10 is denoted by "d", this distance d has a maximum value of 2 mm. Preferably, the distance d is equal to 0.5 mm.

The antinoise chamber intersects with the inclined surface 64 along an edge 70. A diametral axis YY (see FIG. 3) passes through the centre of two opposed teeth 52 of the pole wheel, and the intersecting edge 70 makes an angle A, FIG. 3, with this diametral plane YY. The value of the angle A lies between 40° and 50°, and is preferably 45°.

It has been established that in the operation of the alternator as described above, the noise generated, regardless of the speed of the alternator and regardless of the output which it is delivering, is very much smaller than is the case with similar alternators of known type and of similar size. Due to the physical position of the antinoise chamfers on each tooth 52, and their dimensional characteristics, the pole wheels 21 and 22 retain a mechanical rigidity which is substantially identical to known pole wheels, while their magnetic performance is not affected in any way.

The particular embodiment described above is in no way limiting, and any modifications within the competence of the person skilled in the art may be applied to it without departing in any way from the scope of the present invention. In particular, the pole wheels 21 and 22 need not be identical to each other, so that for example the number of teeth 52 may be different from that shown in the drawings.

In addition, when a tooth 52 has two antinoise chamfers 66, the latter need not be identical to each other, so that they are then asymmetrical with respect to the axis X—X.

More precisely, the values corresponding to the distance d and the angle A may be different in respect of each of the two antinoise chamfers 66 of any given tooth 52.

What is claimed is:

1. A three-phase alternator for a motor vehicle comprising a stator assembly and a rotor assembly carried within the stator assembly, the stator assembly comprising a stator core consisting of a stack of sheet metal laminations and stator windings carried by the stator core, the rotor assembly defining a rotor axis and comprising a pair of claw-type pole wheels arranged in opposed relationship, each said pole wheel comprising a radial plate disposed substantially at right angles to the rotor axis and having first and second opposed surfaces and a plurality of polar teeth extending from the first opposed surface of said radial plate in a direction substantially parallel to the rotor axis, with the teeth of each pole wheel being offset circumferentially from those of the other pole wheel, each of said polar teeth and said rotor axis defining a radial direction, each polar tooth having a cylindrical outer surface, two lateral surfaces, and two peripheral first chamfers each joining the cylindrical outer surface of the tooth to a respective one of said lateral surfaces thereof, each polar tooth further comprising an inclined surface joining its said cylindrical outer surface to the second opposed surface of the radial plate, wherein each said polar tooth is formed with a pair of antinoise chamfers for reducing noise caused by air turbulence during rotation of said rotor assembly, each said antinoise chamfer being inclined at an angle relative to said radial direction and being connected to the second opposed surface of the radial plate and the cylindrical outer surface, a respective peripheral chamfer and lateral surface and the inclined surface of said tooth, with each said lateral surface, inclined surface and peripheral chamfer to which each antinoise chamfer is connected being inclined to a radial direction by an angle different from that of their respective antinoise chamfer.

2. An alternator according to claim 1 wherein each tooth defines an axis of symmetry, and said antinoise chamfers are disposed identically with respect to said axis of symmetry.

3. An alternator according to claim 1, wherein each antinoise chamfer consists of a substantially flat surface.

4. An alternator according to claim 1, wherein each antinoise chamfer defines a point of intersection with its adjacent said lateral tooth surface, said point of intersection being situated at a first distance from the second opposed surface of the radial plate of the pole wheel, the stator core defining a radial terminal end plane of the stator core, said first distance being such that said point of intersection lies substantially in said terminal plane of the stator core.

5. An alternator according to claim 4, wherein said point of intersection defines a second distance from said terminal and plane of the stator core, the second distance having a value in the range of 0 to 2 mm.

6. An alternator according to claim 5, wherein said second distance is 0.5 mm.

7. An alternator according to claim 1, wherein each pole wheel has a pair of diametrically opposed said teeth defining a diametral axis bisecting each of said diametrically opposed teeth, with each said antinoise chamfer defining an intersecting edge which makes an angle in the range of 40° to 50° with said diametral axis.

8. An alternator according to claim 7, wherein said angle defined between the intersection edge and the diametral axis is 45°.

9. A claw type pole wheel for use in a rotor assembly in a motor vehicle alternator comprising:

a plate member having first and second opposed surfaces and an axial bore defining an axis of rotation; and a plurality of polar teeth extending from said plate member first surface, each of said teeth and said axis of rotation defining a radius, each of said polar teeth including:

an outer surface defining a pair of lateral edge portions and a base edge portion, a base surface disposed at an angle relative to said outer surface and extending from said base edge portion to said plate member second surface, said base surface defining a pair of side edge portions, a peripheral chamfer surface extending from each of said lateral edge portions and disposed at an angle relative to said outer surface, a lateral surface disposed at an angle relative to each said peripheral chamfer surface, and an antinoise chamfer surface extending from each said base surface side edge portion, each said antinoise chamfer surface being connected to said tooth outer surface, one of said peripheral chamfer surfaces and one of said tooth lateral surfaces, each said tooth lateral surface, outer surface, base surface, peripheral chamfer surface, and antinoise chamfer surface being inclined at an angle relative to said radius, said angle of inclination of each said antinoise chamfer surface being different from the angle of inclination of said tooth lateral surface, outer surface, base surface, and peripheral chamfer surface.

10. A claw type pole wheel as recited in claim 9, wherein said polar teeth are arranged along a circumference of said plate member first surface in opposed pairs, each of said opposed pairs of teeth defining an axis Y—Y, each base surface side edge portion being disposed at an angle relative to said Y—Y axis in a range of 40° to 50°.

* * * * *

UNITED STATES PATENT AND TRADEMARK OFFICE
CERTIFICATE OF CORRECTION

PATENT NO. : 5,270,605
DATED : December 14, 1993
INVENTOR(S) : Philippe LeFrancois, et al It is certified that error appears in the above-indentified patent and that said Letters Patent is hereby corrected as shown below:

In Claim 4, column 5, line 47, after "terminal", insert -- end --.

In Claim 5, column 5, line 51, delete "and" and insert therefor -- end --.

Signed and Sealed this

Fifth Day of July, 1994

Attest:

BRUCE LEHMAN

*Attesting Officer*    *Commissioner of Patents and Trademarks*